United States Patent
Fu

(10) Patent No.: US 9,465,593 B2
(45) Date of Patent: Oct. 11, 2016

(54) METHOD AND APPARATUS FOR TESTING BROWSER COMPATIBILITY

(71) Applicant: Tencent Technology (Shenzhen) Company Limited, Shenzhen, Guangdong (CN)

(72) Inventor: Yanghui Fu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/752,222

(22) Filed: Jun. 26, 2015

(65) Prior Publication Data

US 2015/0301811 A1     Oct. 22, 2015

Related U.S. Application Data

(63) Continuation of application No. PCT/CN2013/087607, filed on Nov. 21, 2013.

(30) Foreign Application Priority Data

Jan. 23, 2013  (CN) .......................... 2013 1 0025121

(51) Int. Cl.
*G06F 9/45* (2006.01)
*G06F 11/36* (2006.01)

(52) U.S. Cl.
CPC .............. *G06F 8/427* (2013.01); *G06F 11/368* (2013.01)

(58) Field of Classification Search
CPC ............................. G06F 8/427; G06F 11/3636
See application file for complete search history.

(56) References Cited

U.S. PATENT DOCUMENTS

| | | | |
|---|---|---|---|
| 6,202,062 B1* | 3/2001 | Cameron | G06F 17/30876 |
| 6,202,201 B1* | 3/2001 | Domi | G06F 8/425 |
| | | | 715/234 |
| 6,721,736 B1* | 4/2004 | Krug | G06F 17/30864 |
| | | | 707/634 |
| 2002/0099738 A1* | 7/2002 | Grant | G06F 9/4443 |
| | | | 715/234 |
| 2003/0023444 A1* | 1/2003 | St. John | H04M 3/382 |
| | | | 704/270.1 |
| 2004/0015408 A1* | 1/2004 | Rauen, IV | G06Q 10/10 |
| | | | 705/26.41 |
| 2006/0069808 A1* | 3/2006 | Mitchell | G06F 17/30905 |
| | | | 709/246 |
| 2007/0226314 A1* | 9/2007 | Eick | G06F 17/30896 |
| | | | 709/217 |
| 2010/0082743 A1* | 4/2010 | Zeng | H04L 29/06 |
| | | | 709/203 |
| 2010/0281537 A1* | 11/2010 | Wang | G06F 9/468 |
| | | | 726/22 |
| 2011/0289479 A1* | 11/2011 | Pletter | G06F 17/30575 |
| | | | 717/122 |
| 2012/0233668 A1* | 9/2012 | Leafe | G06F 9/5022 |
| | | | 726/4 |
| 2012/0272178 A1* | 10/2012 | Oygard | G06F 17/30884 |
| | | | 715/781 |
| 2013/0124545 A1* | 5/2013 | Holmberg | G06F 17/30244 |
| | | | 707/756 |
| 2013/0198612 A1* | 8/2013 | Ceze | G06F 17/30899 |
| | | | 715/235 |
| 2014/0052617 A1* | 2/2014 | Chawla | G06Q 10/10 |
| | | | 705/39 |
| 2014/0189676 A1* | 7/2014 | Mahajan | G06F 8/43 |
| | | | 717/170 |
| 2015/0347274 A1* | 12/2015 | Taylor | G06F 11/362 |
| | | | 717/125 |

* cited by examiner

*Primary Examiner* — Chameli Das
(74) *Attorney, Agent, or Firm* — Anova Law Group, PLLC

(57) ABSTRACT

A method and an apparatus for testing browser compatibility are provided. The method may include pre-processing source code of a webpage to determine a code type. A compatibility rule library may be obtained according to the code type. Further, a syntax parsing may be conducted on the source code to obtain a syntax tree of the source code. The browser compatibility of the webpage may be tested by conducting a static analysis of the source code based on the compatibility rule library and the syntax tree. The disclosed method and apparatus for testing browser compatibility can automatically conduct static analysis of the webpage source code to test browser compatibility, which is simple and inexpensive.

20 Claims, 3 Drawing Sheets

METHOD AND APPARATUS FOR TESTING BROWSER COMPATIBILITY

CROSS-REFERENCE TO RELATED APPLICATIONS

This application is a continuation of International Patent Application No. PCT/CN2013/087607, entitled "Method and Apparatus for Testing Browser Compatibility," filed on Nov. 21, 2013. This application claims the benefit and priority of Chinese Patent Application No. 201310025121.7, entitled "Method and Apparatus for Testing Browser Compatibility," filed on Jan. 23, 2013. The entire disclosures of each of the above applications are incorporated herein by reference.

TECHNICAL FIELD

The present invention relates to the internet, and more particularly, to a method and apparatus for testing browser compatibility.

BACKGROUND

As the internet develops, more users are using their preferred web browsers to browse the internet. Because of the wide variety of web browsers available, and that a number of users are still using old versions of browsers, webpage developers need to have the ability to develop webpages that are browser compatible, where the appearance and functions of each webpage is uniform across all browser environments.

To ensure uniformity, webpages need to be tested under different browsers. Even though some automated testing tools exist, they still require the tester to run the testing tool in each browser environment. Furthermore, current testing tools do not pinpoint to the tester the problems if the webpage is determined to be incompatible across browsers. The tester has to determine where it is incompatible, which requires a high level of skill and a great amount of time and effort from the tester.

Thus, there is a need to provide a simple and low maintenance method and apparatus for testing browser compatibility to address the issues in the prior art.

SUMMARY OF THE INVENTION

To address the issues in prior art where browser compatibility tests are complex and high maintenance, the embodiments of the present invention provide a method and apparatus for testing browser compatibility through static analysis of the webpage source code.

In accordance with the embodiments of the present invention, a method for testing browser compatibility is provided, the method comprising: pre-processing source code of the webpage to determine a code type; obtaining a compatibility rule library according to the code type; conducting syntax parsing of the source code to obtain a syntax tree of the source code; and conducting static analysis of the source code based on the compatibility rule library and the syntax tree.

In accordance with the embodiments of the present invention, an apparatus for testing browser compatibility is provided, the apparatus comprising: a code type acquisition module configured to pre-process source code of the webpage to determine a code type; a compatibility rule library acquisition module configured to obtain a compatibility rule library according to the code type; a syntax tree acquisition module configured to conduct syntax parsing of the source code to obtain a syntax tree of the source code; and a testing module configured to conduct static analysis of the source code based on the compatibility rule library and the syntax tree.

In accordance with the embodiments of the present invention, a computer-readable medium having stored thereon computer-executable instructions, said computer-executable instructions for performing a method for testing browser compatibility is provided, the method comprising: pre-processing source code of the webpage to determine a code type; obtaining a compatibility rule library according to the code type; conducting syntax parsing of the source code to obtain a syntax tree of the source code; and conducting static analysis of the source code based on the compatibility rule library and the syntax tree.

As compared to prior art technology, in accordance with the method and apparatus for testing browser compatibility of the present invention, static analysis of the webpage source code is conducted to test browser compatibility, which is simple and inexpensive. The present invention addresses the issues of complex operations and high maintenance costs in the prior art.

BRIEF DESCRIPTION OF THE DRAWINGS

To better illustrate the technical features of the embodiments of the present invention, various embodiments of the present invention will be briefly described in conjunction with the accompanying drawings.

DESCRIPTION OF THE PREFERRED EMBODIMENTS

To better illustrate the purpose, technical features, and advantages of the embodiments of the present invention, various embodiments of the present invention will be further described in conjunction with the accompanying drawings.

Figure 1:
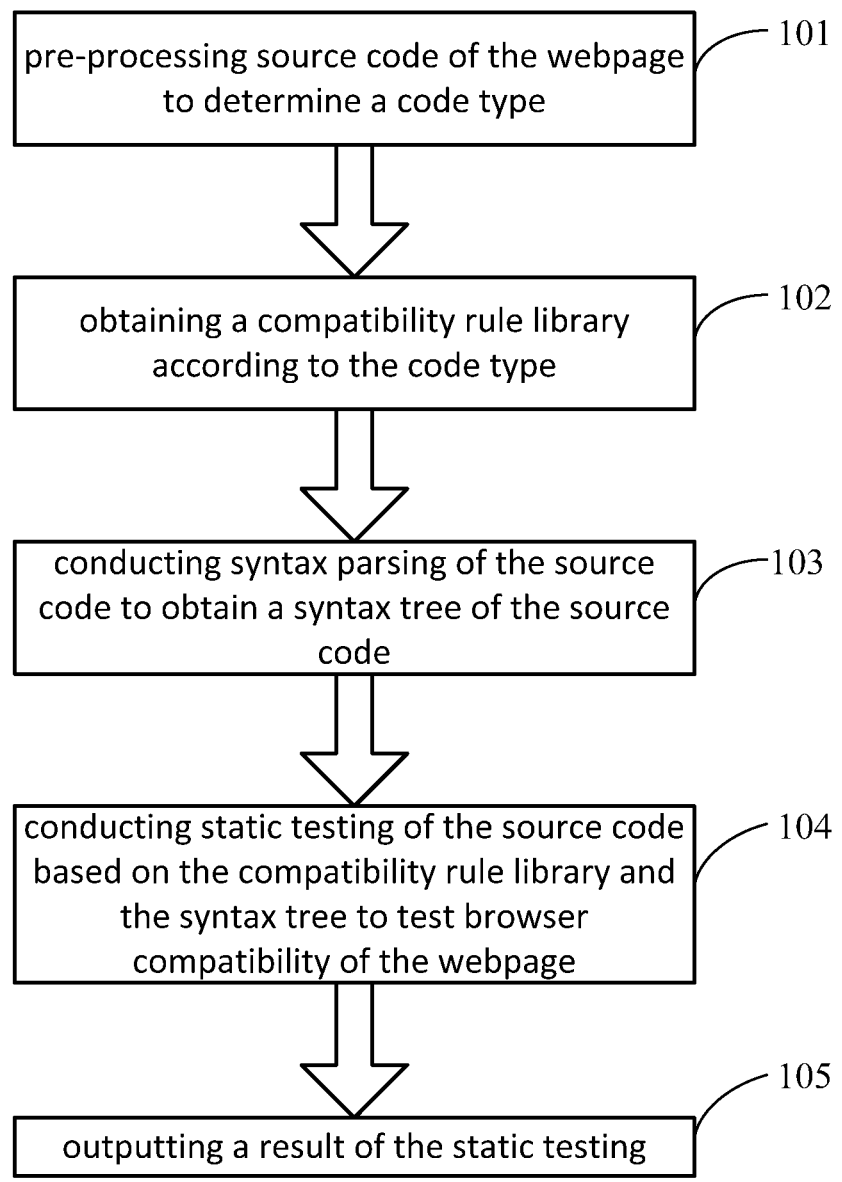
FIG. 1 is an exemplary flowchart for a method for testing browser compatibility of a webpage in accordance with an embodiment of the present invention.

As show in FIG. 1, an exemplary flowchart for a method for testing browser compatibility of a webpage in accordance with an embodiment of the present invention is provided. The method for testing browser compatibility includes the following steps:

Step 101: pre-processing source code of the webpage to determine a code type.

Step 102: obtaining a compatibility rule library according to the code type.

Step 103: conducting syntax parsing of the source code and obtaining a syntax tree of the source code.

Step 104: conducting static analysis of the source code based on the compatibility rule library and the syntax tree to test browser compatibility.

Step 105: outputting of the browser compatibility test results.

The method for testing browser compatibility in this embodiment concludes at step 105.

The implementation details of the steps in the method for testing browser compatibility in this embodiment will be further described below.

Figure 2:
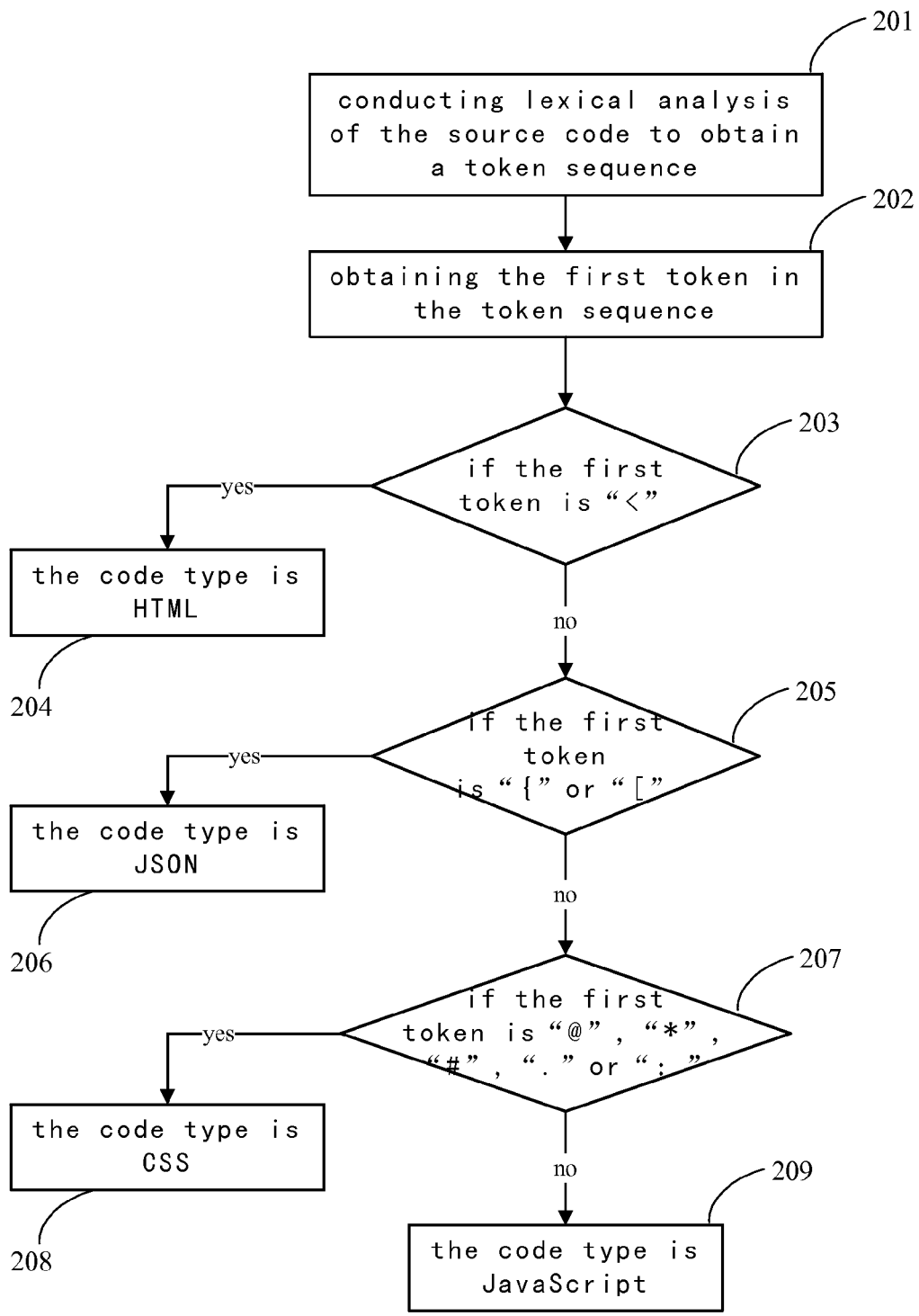
FIG. 2 is a detailed exemplary flowchart for Step 101 in the method for testing browser compatibility of a webpage in accordance with an embodiment of the present invention.

As shown in FIG. 2, a detailed exemplary flowchart for Step 101 of a method for testing browser compatibility of a webpage in accordance with the embodiment of the present invention is provided. Step 101 further comprises Steps 201, 202, 203. 204, 205, 206, 207, 208, and 209.

In Step 201, lexical analysis of the source code is conducted to obtain a token sequence of the source code. Here, each token is a character, which is the smallest unit that forms the source code. The token may be analyzed by a lexical analyzer. The lexical analyzer reads characters of the webpage source code from left to right and thereby scans the characters in a source code stream. Then the lexical analyzer identifies the token based on the structure of the source code and obtains the token sequence of the source code.

The code type of the webpage is subsequently determined based on the token sequence of the source code. In Step 202, the first token of the token sequence is obtained. In Steps 203 and 204, if the first token is "<", then the code type is determined to be HTML (Hypertext Markup Language) (source code of HTML usually begins with "<"). In Steps 205 and 206, if the first token is "{" or "[", then the code type is determined to be JSON (JavaScript Object Notation) (source code of JSON usually begins with "{" or "["). In Steps 207 and 208, if the first token is "@", "*", "#", "." or ":", then the code type is determined to be CSS (Cascading Style Sheets) (source code of CSS is usually "@", "*", "#", "." or ":"). In step 209, if the first token is none of the above, then the code type is determined to be JavaScript. This is but an exemplary method to determine the code type through lexical characteristics of the source code, and other methods to determine the code type through lexical characteristics of the source code can also be used.

Step 102 is next.

In Step 102, a compatibility rule library is obtained according to the code type, wherein the compatibility rule library includes a plurality of regular expressions and a plurality of logical relationships among the regular expressions. The compatibility rules can be stored as key-value pairs in the JSON file. Different code types have different type compatibility rule libraries, and the appropriate compatibility rule library is selected in this step.

In Step 103, the source code is parsed to obtaining a syntax tree of the source code. Here, syntax parsing combines token into syntactic phrases based on lexical analysis, such as "program", "statement" and "expression". Syntax parsing may be done through a syntax parser that uses a top-down operator precedence algorithm. Different types of source code can be parsed using different syntax parsers to obtain a syntax tree for the source code. The algorithm for obtaining the syntax tree can be any algorithm that is currently known in the field, which will not be further described here.

Step 104 is next.

In Step 104, static analysis of the source code is conducted based on the compatibility rule library retrieved in Step 102 and the syntax tree retrieved in Step 103 to test browser compatibility.

The compatibility rule library can be a plurality of regular expressions, and the logical relationships among the regular expressions, such as "or", "and" or "but not". If "or" logic is used, then a source code is incompatible if it does not match at least one regular expression from the plurality of regular expressions, so the source code must match all regular expressions to be compatible. If "and" logic is used, then a source code is incompatible if it does not match any of the regular expressions, so the source code must match at least one of the plurality of regular expressions to be compatible. If "but not" logic is used, then a source code is incompatible if it does not match some regular expressions from the plurality of regular expressions, so the source code is compatible if all regular expressions are matched or mismatched. For example, under the "but not" logic, if a source code containing sequence A is incompatible with a certain browser, but the source code becomes compatible if it also contains sequence B, then the source code is compatible if the source code contains either both A and B, or neither A or B.

If compatibility is determined through a single regular expression, the regular expression may include inclusion operation, comparison operation, or replacement operation. The inclusion operation is used to determine the whether one section of source code includes the another section of source codes; the comparison operation is used to compare the attribute value of relevant source codes; and the replacement operating is used to replace certain variables of the regular expression with the result of an operation to conduct further compatibility testing.

It is obvious that the compatibility rule library is not limited to the rules in the above examples, and may include other rules, and that these rules be added, deleted or modified based on need. In this step, a syntax tree of the source code is used to determine the code type of the source code, and a compatibility rule library is used to conduct static analysis of the source code to test browser compatibility, which significantly reduces the time required for testing the compatibility of the webpage.

Step 105 is next.

In Step 105, the test program will output the results of the browser compatibility test, which can include the location of the mismatched source code, the reason of mismatch, and the corresponding rules from the compatibility rule library. The webpage developer may amend the incompatible sections of the source code according to the test results to make the webpage browser compatible.

Figure 3:
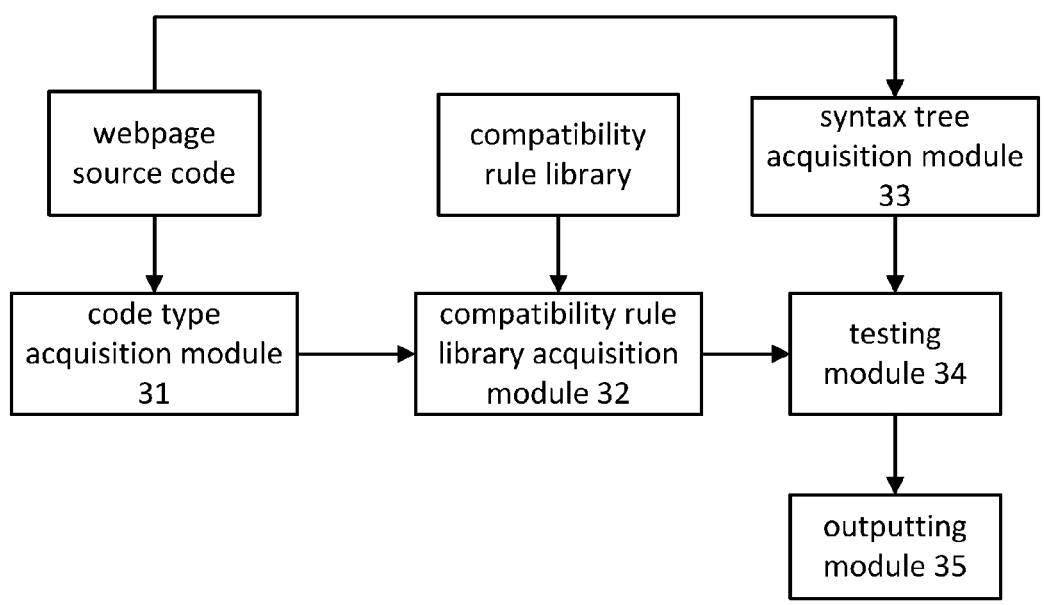
FIG. 3 is an exemplary schematic diagram for the apparatus for testing browser compatibility of a webpage in accordance with another embodiment of the present invention.

As shown in FIG. 3, an exemplary schematic diagram for an apparatus for testing browser compatibility of a webpage in accordance with another embodiment of the present invention is provided. The apparatus for testing browser compatibility includes a code type acquisition module 31, a compatibility rule library acquisition module 32, a syntax tree acquisition module 33, a testing module 34, and an outputting module 35. The code type acquisition module 31 can be used for pre-processing the source code of the webpage to obtain a code type. The compatibility rule library acquisition module 32 can be used for acquiring the applicable compatibility rules based on the code type. The syntax tree acquisition module 33 can be used for obtaining the syntax tree of the source code based on syntax parsing the source code. The testing module 34 can be used for static analysis of the source code based on the compatibility rule library and syntax tree. The outputting module 35 can be used to output the result of the static analysis.

During the operation of the apparatus for testing browser compatibility in this embodiment, the code type acquisition module 31 conducts lexical analysis of the source code to obtain a token sequence of the source code. The code type acquisition unit 31 also includes a code type acquisition unit for acquiring the code type based on the token sequence of the source code. First, the first token of the token sequence is obtained. If the first token is "<", then the code type is determined to be HTML (Hypertext Markup Language)

(source code of HTML usually begins with "<"). If the first token is "{" or "[", then the code type is determined to be JSON (JavaScript Object Notation) (source code of JSON usually begins with "{" or "["). If the first token is "@", "*", "#", "." or ":", then the code type is determined to be CSS (Cascading Style Sheets) (source code of CSS is usually "@", "*", "#", "." or ":"). If the first token is none of the above, then the code type is determined to be JavaScript.

Subsequently, the compatibility rule library acquisition module 32 obtains the applicable compatibility rules based on the code type. The syntax tree acquisition module 33 then obtains the syntax tree of the source code based on syntax parsing the source code. The testing module 34 conducts static analysis of the source code based on the compatibility rule library and syntax tree, wherein the compatibility rule library comprises a plurality of regular expressions and a plurality of logical relationships among the regular expressions in a JSON file. Finally, the outputting module 35 outputs the result of the static analysis.

The operational principle of the embodiment of the apparatus for testing browser compatibility is identical or similar to that described in the preferred embodiment of the method for testing browser compatibility; and the description of the method embodiment can be referenced for the implementation details of the apparatus embodiment.

Below is a section of webpage source code used to illustrate the processes of the method and apparatus for testing browser compatibility in accordance with the present invention.

The source code is as follows:

```
<!DOCTYPE HTML>
<html>
<head>
<meta http-equiv="Content-Type" content="text/html; charset=utf-8"/>
<style type="text/css">
body {
  color: blue;
}
h1 {
  font-size: 18px;
}
</style>
<script type="text/javascript">
window.onload=function( ) {
  var $header=document.getElementById("header");
  alert($header.currentStyle.fontWeight);
  alert($header.currentStyle.fontSize);
  alert($header.currentStyle.color);
}
</script>
</head>
<body>
  <h1 id="header" style="color:red;">Header 1</h1>
</body>
</html>
```

First, lexical analysis of the source code is conducted to obtain the token sequence of the source code. The first token is "<", so the code type is HTML. Second, the source code is parsed to obtain the syntax tree of the source code. Because browsers such as Firefox, Chrome, and Safari do not support currentStyle statements, and browsers such as IE6, IE7 and IE8 do not support getComputedStyle statements, "but not" logic is used for these two statements to determine browser compatibility, i.e., the webpage is compatible only when currentStyle statements and getComputedStyle statements are both present (webpage supports all browsers), or both absent (webpage has neither statements). Lastly, the result of the static analysis results is outputted.

Web developers may take appropriate actions to fix compatibility problems according to the static analysis results.

In accordance with the embodiments of the present invention, the method and apparatus for testing browser compatibility conducts static analysis of the source code for testing browser compatibility. As the source code does not need to be tested for each browser, the testing process is simple and of low cost, which addresses the issue of complex operations and high maintenance costs in the prior art.

Note that one or more of the functions described above can be performed by software or firmware stored in memory and executed by a processor, or stored in program storage and executed by a processor. The software or firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The various embodiments of the present invention are merely preferred embodiments, and are not intended to limit the scope of the present invention, which includes any modification, equivalent, or improvement by a person of ordinary skill in the art that does not depart from the spirit and principles of the present invention.

What is claimed is:

1. A method for testing browser compatibility of a webpage executed by a processor of a computation terminal, comprising:
    pre-processing source code of the webpage to determine a code type;
    obtaining, from a memory of the computation terminal, a compatibility rule library according to the code type;
    conducting syntax parsing of the source code to obtain a syntax tree of the source code; and
    conducting static analysis of the source code based on the compatibility rule library and the syntax tree;
    wherein:
    the compatibility rule library comprises a plurality of regular expressions and a plurality of logical relationships among the regular expressions;
    the regular expressions include at least: a first pattern matching expression that identifies whether a first section of code exists in the source code, and a second pattern matching expression that identifies whether a second section of code exists in the source code;
    the logical relationships include at least a logical relationship corresponding to the first pattern matching expression and the second pattern matching expression; and
    a result of applying the logical relationship corresponding to the first pattern matching expression and the second pattern matching expression indicates whether the source code is incompatible with one or more browsers.

2. The method of claim 1, wherein the compatibility rule library comprises a plurality of key-value pairs.

3. The method of claim 1, wherein the step of pre-processing source code of the webpage to obtain a code type further comprises:
conducting lexical analysis of the source code to obtain a token sequence of the source code; and
determining the code type of the webpage on the token sequence of the source code.

4. The method of claim 3, wherein the step of determining the code type of the webpage on the token sequence of the source code further comprises:
obtaining the first token in the token sequence;
determining the code type to be HTML if the first token is "<";
determining the code type to be JSON if the first token is "{" or "[",
determining the code type to be CSS if the first token is selected from a group consisting of "@", "*" "#", "." and ":"; and
determining the code type to be JAVASCRIPT if the first token is not selected from a group consisting of "<", "{", "[", "@", "*", "#", "." and ":".

5. The method of claim 1, further comprising:
outputting a result of the static analysis.

6. The method of claim 1, wherein:
the logical relationships include at least one of an OR logic, an AND logic, and an XOR logic.

7. The method of claim 6, wherein:
when the logical relationship corresponding to the first pattern matching expression and the second pattern matching expression is the OR logic, the source code is determined to be incompatible if either one of the first section of code and the second section of code does not exist in the source code;
when the logical relationship corresponding to the first pattern matching expression and the second pattern matching expression is the AND logic, the source code is determined to be incompatible if neither one of the first section of code and the second section of code exist in the source code; and
when the logical relationship corresponding to the first pattern matching expression and the second pattern matching expression is the XOR logic, the source code is determined to be incompatible if only one of the first section of code and the second section of code exist in the source code.

8. The method of claim 1, wherein the regular expressions further include a single regular expression that determines whether the source code is incompatible, and the method further comprising:
when the single regular expression is an inclusion operation, determining whether the source code is incompatible according to whether one section of source code includes another section of source code;
when the single regular expression is a comparison operation, determining whether the source code is incompatible by comparing an attribute value of one section of source code with a set value; and
when the single regular expression is a replacement operation, replacing a variable in the single regular expression with a result from a previous regular expression to conduct further compatibility testing.

9. An apparatus for testing browser compatibility of a webpage, comprising at least one processor, memory, and a plurality of program modules stored in the memory and to be executed by the at least one processor, the plurality of program modules comprising:
a code type acquisition module configured to pre-process source code of the webpage to determine a code type;
a compatibility rule library acquisition module configured to obtain a compatibility rule library according to the code type;
a syntax tree acquisition module configured to conduct syntax parsing of the source code to obtain a syntax tree of the source code; and
a testing module configured to conduct static analysis of the source code based on the compatibility rule library and the syntax tree;
wherein:
the compatibility rule library comprises a plurality of regular expressions and a plurality of logical relationships among the regular expressions;
the regular expressions include at least: a first pattern matching expression that identifies whether a first section of code exists in the source code, and a second pattern matching expression that identifies whether a second section of code exists in the source code;
the logical relationships include at least a logical relationship corresponding to the first pattern matching expression and the second pattern matching expression; and
a result of applying the logical relationship corresponding to the first pattern matching expression and the second pattern matching expression indicates whether the source code is incompatible with one or more browsers.

10. The apparatus for claim 9, wherein the compatibility rule library comprises the plurality of regular expressions and the plurality of logical relationships among the regular expressions in a JSON file.

11. The apparatus for claim 9, wherein the compatibility rule library comprises a plurality of key-value pairs.

12. The apparatus for claim 9, wherein the code type acquisition module further comprises:
a lexical analysis unit configured to conduct lexical analysis of the source code to obtain the token sequence of the source code; and
a code type acquisition unit for configured to determine the code type of the webpage on the token sequence of the source code.

13. The apparatus for claim 12, wherein code type acquisition module is further configured for:
obtaining the first token in the token sequence;
determining the code type to be HTML if the first token is "<";
determining the code type to be JSON if the first token is "{" or "[", determining the code type to be CSS if the first token is selected from a group consisting of "@", "*" "#", "." and ":"; and
determining the code type to be JAVASCRIPT if the first token is not selected from a group consisting of "<", "{", "[", "@", "*", "#", "." and ":".

14. The apparatus for claim 9, further comprising:
an outputting module configured to output a result of the static analysis.

15. A non-transitory computer-readable medium having stored thereon computer-executable instructions, said computer-executable instructions for performing a method for testing browser compatibility of a webpage, the method comprising:
pre-processing source code of the webpage to determine a code type;
obtaining a compatibility rule library according to the code type;

conducting syntax parsing of the source code to obtain a syntax tree of the source code;
conducting static analysis of the source code based on the compatibility rule library and the syntax tree;
wherein:
the compatibility rule library comprises a plurality of regular expressions and a plurality of logical relationships among the regular expressions;
the regular expressions include at least: a first pattern matching expression that identifies whether a first section of code exists in the source code, and a second pattern matching expression that identifies whether a second section of code exists in the source code;
the logical relationships include at least a logical relationship corresponding to the first pattern matching expression and the second pattern matching expression; and
a result of applying the logical relationship corresponding to the first pattern matching expression and the second pattern matching expression indicates whether the source code is incompatible with one or more browsers.

16. The computer-readable medium of claim 15, wherein the compatibility rule library comprises the plurality of regular expressions and the plurality of logical relationships among the regular expressions in a JSON file.

17. The computer-readable medium of claim 16, wherein the compatibility rule library comprises a plurality of key-value pairs.

18. The computer-readable medium of claim 15, wherein the step of pre-processing source code of the webpage to obtain a code type further comprises:
conducting lexical analysis of the source code to obtain the token sequence of the source code; and
determining the code type of the webpage on the token sequence of the source code.

19. The computer-readable medium of claim 18, wherein the step of determining the code type of the webpage on the token sequence of the source code further comprises:
obtaining the first token in the token sequence;
determining the code type to be HTML if the first token is "<";
determining the code type to be JSON if the first token is "{" or "[", determining the code type to be CSS if the first token is selected from a group consisting of "@", "*" "#", "." and ":"; and
determining the code type to be JAVASCRIPT if the first token is not selected from a group consisting of "<", "{", "[", "@", "*", "#", "." and ":".

20. The computer-readable medium of claim 15, further comprising:
outputting a result of the static analysis.

* * * * *